United States Patent [19]

Hashimoto

[11] Patent Number: 4,712,097

[45] Date of Patent: Dec. 8, 1987

[54] AUTOMATIC MEASURING/ALARM APPARATUS FOR MEASURING RADIOACTIVE CONCENTRATION OR THE LIKE

[76] Inventor: Kazuo Hashimoto, 28-2, Komazawa 2-chome, Setagaya-ku, Tokyo, 154, Japan

[21] Appl. No.: 674,156

[22] PCT Filed: Mar. 16, 1984

[86] PCT No.: PCT/JP84/00111

§ 371 Date: Nov. 2, 1984

§ 102(e) Date: Nov. 2, 1984

[87] PCT Pub. No.: WO84/03775

PCT Pub. Date: Sep. 27, 1984

[30] Foreign Application Priority Data

Mar. 18, 1983 [JP] Japan .................. 58-45594

[51] Int. Cl.⁴ .......................................... G08B 17/12
[52] U.S. Cl. ........................... 379/40; 340/533; 340/600; 379/106
[58] Field of Search ............ 340/600, 533, 531; 250/388, 374; 179/2 A, 2 AM, 5 P, 5 R

[56] References Cited

U.S. PATENT DOCUMENTS

| | | | |
|---|---|---|---|
| 3,038,997 | 6/1962 | Manning et al. | 340/600 X |
| 3,536,839 | 10/1970 | Prins | 179/5 P |
| 3,617,640 | 11/1971 | Cichanowicz | 179/5 P |
| 3,657,540 | 4/1972 | Maillot | 250/374 |
| 3,787,624 | 1/1974 | Spitalny et al. | 179/2 A |
| 4,492,820 | 1/1985 | Kennard et al. | 179/2 A X |

FOREIGN PATENT DOCUMENTS 0164981 9/1900 Netherlands .................. 340/600

Primary Examiner—James L. Rowland
Assistant Examiner—Jeffery A. Hofsass
Attorney, Agent, or Firm—Lowe, Price, LeBlanc, Becker & Shur

[57] ABSTRACT

Pulse sounds from a measuring device (1) for measuring a radioactive concentration or the like are counted by a preset counter (2). When a count of the preset counter (2) exceeds a predetermined value, the automatic dial device (5-1, 5-2, 5-3) is started to call an owner or the like of a measuring/alarm apparatus. When the owner answers the telephone, an alarm sound is sent from an alarm sound generator (7) onto the telephone line. Output pulse sounds from the measuring device (1) are recorded in a recording device (11) for every predetermined time interval after the alarm sound is sent onto the telephone line. The recorded pulse sounds can be sent to a remote location in response to a remote control signal.

3 Claims, 1 Drawing Figure

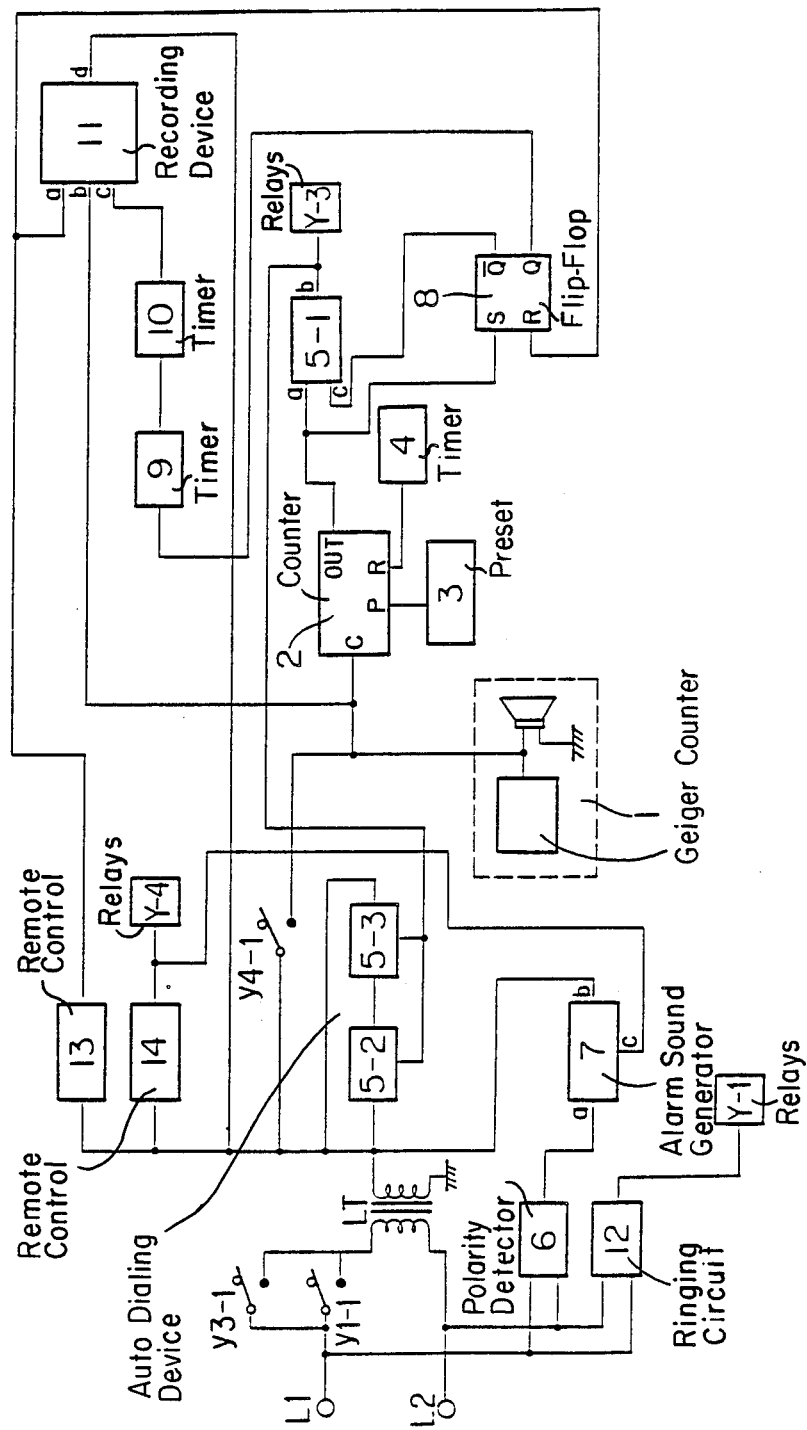

AUTOMATIC MEASURING/ALARM APPARATUS FOR MEASURING RADIOACTIVE CONCENTRATION OR THE LIKE

TECHNICAL FIELD

The present invention relates to measurement of a radioactive concentration and, more particularly, to an automatic measuring/alarm apparatus for measuring a radioactive concentration from a remote location using a telephone circuit.

BACKGROUND ART

A commercially available Geiger counter as a radioactive measuring instrument can be carried by an unskilled person. If he wishes to use the Geiger counter, he turns on a power switch of the counter. The person can discriminate a radioactive concentration in accordance with click sounds and a reading of the meter.

However, it is very dangerous and inconvenient for an unskilled person to enter into a specific area subjected to a radioactive leakage and to measure a radioactive concentration by carrying the Geiger counter.

DISCLOSURE OF THE INVENTION

It is a first object of the present invention to provide an automatic measuring/alarm apparatus for measuring a radioactive concentration or the like, wherein a Geiger counter is built into a predetermined position inside the apparatus so as to detect abnormality such as radioactive contamination from a remote location using a telephone circuit.

It is a second object of the present invention to provide an automatic measuring/alarm apparatus for measuring a radioactive concentration or the like, wherein the Geiger counter is rendered operative for every predetermined interval, and an automatic dial device is operated to transmit an owner of the apparatus at a remote location when a radioactive concentration exceeds a predetermined value.

It is a third object of the present invention to provide an automatic measuring/alarm apparatus for measuring a radioactive concentration, wherein sounds generated by the Geiger counter are automatically recorded after abnormality such as radioactive contamination is detected.

It is a fourth object of the present invention to provide an automatic measuring/alarm apparatus for measuring a radioactive concentration or the like, wherein the sounds from the Geiger counter and sounds recorded by a recording device are transmitted from a remote location through the telephone line.

In order to achieve the above objects of the present invention, there is provided an automatic measuring/alarm apparatus for measuring a radioactive concentration or the like, comprising a measuring device such as a Geiger counter for measuring a radioactive concentration, a preset counter for counting pulse sounds from the measuring device and generating an output when a count thereof exceeds a predetermined value, and timer means for resetting the preset counter for every predetermined time interval, wherein a telephone line is engaged upon detection of an output from the preset counter, that is, upon detection of abnormality, and at the same time an automatic dial device is operated, so that an owner of the apparatus is called through the telephone line, an off-hook operation of an owner is detected by a detector, an output from the detector operates alarm generating means, and an alarm sound from the alarm generating means is sent onto the telephone line.

The measuring/alarm apparatus according to the present invention further has a recording device. After the alarm is sent ot the owner in response to the abnormal detection signal from the preset counter, pulse sounds from the measuring device are recorded in the recording device for every predetermined time interval. When the owner sends a first remote control signal by calling the measuring/alarm appartus through the telephone line, the measuring/alarm appartus causes the recording device to rewind and reproduce a recorded tape, thereby sending information recorded on the tape to the owner. Therefore, the owner can hear the pulse sound from the remote area. When the owner sends a second remote control signal to the measuring/alarm apparatus, the pulse sound from the apparatus can be heard by the owner at the remote location.

Since the apparatus has the arrangement described above according to the present invention, measuring devices for measuring radioactive concentrations are installed at proper locations, thereby detecting increases or decreases in radioactive concentrations at the proper locations through the public telephone circuit. In particular, abnormality such as radioactive contamination can be detected, and its information can be sent to a simple device in a remote location through the public telephone line. Therefore, the measuring/alarm apparatus according to the present invention becomes simpler than the conventional complicated alarm system and become low cost in comparison therewith.

BRIEF DESCRIPTION OF DRAWINGS

The drawing is a block diagram of an automatic measuring/alarm apparatus for measuring a radioactive concentration according to a preferred embodiment of the present invention.

BEST MODE OF CARRYING OUT THE INVENTION

The present invention will be described in detail with reference to the accompanying drawing.

Referring to the drawing, reference symbols L1 and L2 denote telephone lines; LT, and a line transformer. Reference numeral 1 denotes a Geiger counter; and 2, a preset counter counting a pulse sound from the Geiger counter. The preset counter 2 is preset by a rpeset section 3 having a digital switch or the like. When pulses exceeding the preset value in number are supplied to the counter 2, an output terminal OUT of the counter 2 generates a pulse. Reference numeral 4 denotes a first timer for generating a 1-ms reset pulse for every predeetermined time interval, e.g., for every 60 seconds. the counter 2 is reset in response to the reset pulse, so that the counter 2 counts the pulses of the Geiger counter 1 at intervals of 60 seconds. Reference numerals 5-1, 5-2 and 5-3 denote devices constituting an automatic dial device. Reference numberal 5-1 denotes a main device. When a pulse of H level is supplied to a terminal a of the main device 5-1, a relay Y-3 is energized for a predetermined period of time through a terminal b of the device 5-1. In other words, the telephone lines L1 and L2 are looped through a relay contact y3-1. When a terminal C of the main device 5-1 is set at L level, the terminal a will not receive an input. Reference numberal 5-2 denotes a dial toner detector activated by the main device 5-1. Reference numeral 6 denotes a line polarity detector. When the automatic dial device calls the owner in a remote location and the owner answers the telephone, the detector 6 detects an inversion of line polarity and generates an output of H level. Reference numeral 7 denotes an alarm sound genertor for generating a unique alarm sound, e.g., a swept inter in response to the output from the polarity detector 6. Reference numeral 8 denotes a holding circuit comprising a flip-flop set in response to an output from the counter 2. when an output Q from the holding circuit 8 goes to H level, a second timer 9 to be described later is started. However, when an output $\overline{Q}$ goes to L level, the terminal a of the device 5-1 will not receive an input. Reference numeral 9 denotes a second timer for generating a one-shot pulse for a predetermined period of time, e.g., for every 10 minutes. Reference numeral 10 denotes a third timer which is started in response to the output from the second timer 9. The third timer 10 generates a signal of H level for a predetermined period of time, e.g., 60 seconds. Reference numeral 11 denotes a recording device. When the terminal C is set at H level, the recording device 11 is started to record pulse sounds fromt he Geiger counter 1 supplied through the terminal b on a recording tape (not shown). The recording tape is rewound and played in response to a signal supplied through the terminal a. Reference numeral 12 denotes a ringing circuit for detecting a ringing signal supplied from the owner who is out or any third party. Reference numeral Y-1 denotes a loop relay which is held in response to an output from the ringing circuit 12. A responding means for sending out an outgoing message upon reception of a ringing signal is not illustrated since it is known to those skilled in the art. Reference numeral 13 denotes a first remote control circuit for allowing the owner or the like to hear the pulse sound recorded in the recording device. Refernece numeral 14 denotes a second remote control circuit for allowing the owner to hear the pulse from the Geiger counter 1 through the line.

The operation of the measuring/alarm apparatus having the arrangement described above according to the present invention will now be described. The number of pulses from the Geiger counter 1 to operate the device 5-1 is preset by a digital switch (not shown) in the preset section 3. Assume that the preset value is given at 10. When 10 or more pulses are supplied from the Geiger counter 1 to the clock terminal C of the counter 2 in a time preset in the first timer, e.g., 60 seconds, the output terminal OUT of the counter 2 generates a pulse of H level. This pulse is supplied to the device 5-1 through the termianl a, so that the device 5-1 is started to render the relay Y-3 operative. The telephone lines are looped through the contact y3-1 of the relay Y-3 and the primary winding of the line transformer LT, so that a dial tone is sent from the station to the measuring/alarm apparatus. This dial tone is detected by the dial tone detector 5-2. An output from the dial tone detector 5-2 causes the abbreviated dialing generator 5-3 to generate an output which is supplied to the station through the line transformer LT. The station detects the abbreviated dialing and calls a corresponding telephone (owner side). When the owner answers the telephone, the output from the polarity detector 6 is inverted. An inverted signal causes the alarm sound generator 7 to generate the unique sound, e.g., a swept inter. The inter is sent onto the line through the line transformer LT. The owner can know that the radioactive concentration has exceeded a predetermined value by the alarm sound sent through the telephone line. In this case, the pulse sound from the Geiger counter 1 can be directly heard through the line by a remote control operation at the side of the owner.

The second remote control signal sent from the owner is detected by the second remote control circuit 14 through the line transformer LT, so that the relay Y-4 is rendered operative. The pulse sound from the Geiger counter 1 is sent onto the line through the contact y4-1 of the relay Y-4 and the line transformer LT. In this case, the alarm generator 7 is reset in response to the output from the second remote control circuit 14, so that the unique alarm sound is interrupted. Only the above-mentioned pulse sound can be heard. The loop state is cancelled by a timer (not shown) in the device 5-1. Alternatively, the polarity inversion upon on-hook operation by the owner may be detected by the polarity detector 6, and an output from the detector 6 may cancel the loop state. The pulse sound may be directly heard after the automatic dial device is restored. For this purpose, when the measuring/alarm apparatus is accessed from the owner side, the relay Y-1 is held operative through the ringing circuit 12, so that a loop is formed through the contact y1-1, and communication between the owner side and the apparatus side can be achieved. In this case, since an outgoing message is sent from the apparatus side, the owner confirms that the message is sent from the proper apparatus and sends a second remote control signal.

As previously described, when the number of pulses from the Geiger counter 1 exceeds the preset value of the counter 2, and the terminal OUT of the counter 2 generates a pluse of H level, the device 5-1 is started. At the same time, the flip-flop 8 is set, and an input to the terminal a of the device 5-1 through the $\overline{Q}$ terminal of the flip-flop 8 is inhibited. Thereafter, while the flip-flop 8 is being set, the automatic dial device will not be started. The second timer is started through the terminal Q (H level) of the flip-flop 8. The second timer generates a pulse for every predetermined time interval, e.g., for every 10 minutes. The third timer 10 is started in response to this pulse. The timer generates pulses for the predetermined period of time, e.g., 60 seconds. In other words, the third timer starts the recording device 11 through the terminal c for 60 seconds in every 10 minutes. In this case, the pulse sounds from the Geiger counter 1 through the terminal b are recorded on the tape. In order to hear the recorded pulse sounds, after the owner side accesses the apparatus and checks the outgoing message, he sends the first remote control signal. The first remote control signal is detected by the first remote control circuit 13, and a recording tape (not shown) in the recording device is rewound and reproduced through the terminal a. A reproduced output is sent onto the line through a terminal d and the line transformer LT. After confirming the pulse sound on the tape, the owner side sends a remote control signal again. In this case, the recording device is restored by a known means, and the tape is stopped. As described above, after the first remote control signal is sent, the flip-flop 8 is reset in response to the output from the first remote control circuit 13. As a result, the second timer 9 and the third timer 10 will not be started, and the recording device will not be started either. When the number of pulses from the Geiger counter 1 exceeds a predetermined preset value, the device 5-1 is started.

In the above embodiment, the radioactive concentration can be measured by the Geiger counter from a remote location through the telephone line. However, the present invention is not limited to this embodiment. The present invention may be applied to an apparatus for performing automatic dialing for every predetermined time interval and sending information when a measured value of any of various physical quantities exceeds a predetermined value.

I claim:

1. An automatic measuring/alarm apparatus for measuring a radioactive concentration or the like, characterized by comprising:
    a measuring device for expressing a change in a physical quantity such as the radioactive concentration by an audible frequency;
    a preset counter for generating a count output when a number of pulse sounds from said measuring device exceeds a predetermined value;
    timer means for resetting said preset counter for every predetermined time interval;
    an automatic dial device for performing automatic dialing of a preset telephone number in response to the output from said preset counter;
    means for forming a loop of a telephone line upon automatic dialing;
    a polarity detector for inverting a polarity of the telephone line when a telephone set of a called party is taken off-hook;
    means for sending an alarm sound onto the telephone line in response to an output from said polarity detector; and
    a remote control circuit for detecting a remote control signal sent through the telephone line and generating an output; and
    means for sending the pulse sounds received from said measuring device onto the telephone line in response to an output from said remote control circuit.

2. An apparatus according to claim 1, further comprising:
    a holding circuit, set in response to the output from said preset counter, for causing said automatic dial device to be set in an inoperative state;
    means for operating a recording device for a predtermined period of time in every predetermined time interval detrmined by an output from said holding circuit;
    a recording device for recording the pulse sounds from said measuring device;
    means for looping the telephone line by detecting a ringing signal; and
    a reproducing remote control circuit for detecting another remote control signal which is sent from the telephone line and which is different from said remote control signal and generating said another remote control signal;
    whereby the holding circuit is reset in response to an output from said reproducing remote control circuit, thereby rewinding said recording device and sending recorded informaton onto the telephone line.

3. An apparatus according to claim 1, wherein said automatic dial device has an abbreviated dial generator and is operated after dial tone detecting means detects a dial tone when the telephone line is looped.

* * * * *